(12) United States Patent
Tsuritani et al.

(10) Patent No.: US 6,754,420 B2
(45) Date of Patent: Jun. 22, 2004

(54) OPTICAL FIBER TRANSMISSION LINE

(75) Inventors: Takehiro Tsuritani, Saitama (JP); Keiji Tanaka, Saitama (JP); Noboru Edagawa, Saitama (JP); Masatoshi Suzuki, Saitama (JP)

(73) Assignee: KDDI Submarine Cable Systems Inc., Tokyo (JP)

( * ) Notice: Subject to any disclaimer, the term of this patent is extended or adjusted under 35 U.S.C. 154(b) by 134 days.

(21) Appl. No.: 10/056,999

(22) Filed: Jan. 25, 2002

(65) Prior Publication Data

US 2002/0118936 A1 Aug. 29, 2002

(30) Foreign Application Priority Data

Jan. 31, 2001 (JP) ........................................ 2001-023300

(51) Int. Cl.[7] .......................... G02B 6/02; G02B 6/16; G02B 6/28; H04J 14/08; H04B 10/00
(52) U.S. Cl. ........................... 385/123; 385/24; 398/81; 398/136
(58) Field of Search ..................... 385/24, 123; 398/81, 398/136

(56) References Cited

U.S. PATENT DOCUMENTS

| | | |
|---|---|---|
| 5,218,662 A | 6/1993 | Dugan |
| 5,343,322 A | 8/1994 | Pirio et al. |
| 5,361,319 A | 11/1994 | Antos et al. ................ 385/123 |
| 5,696,614 A | 12/1997 | Ishikawa et al. |
| 5,777,770 A | 7/1998 | Naito |
| 5,781,673 A | 7/1998 | Reed et al. |
| 5,877,881 A | 3/1999 | Miyauchi et al. |
| 5,940,207 A | 8/1999 | Weich et al. |
| 5,991,477 A | 11/1999 | Ishikawa et al. |
| 6,021,235 A | 2/2000 | Yamamoto et al. |
| 6,043,914 A | 3/2000 | Cook et al. |
| 6,134,033 A | 10/2000 | Bergano et al. |
| 6,181,449 B1 | 1/2001 | Taga et al. |
| 6,229,935 B1 * | 5/2001 | Jones et al. ................... 385/24 |
| 6,263,138 B1 | 7/2001 | Sillard et al. |
| 6,307,985 B1 | 10/2001 | Murakami et al. |
| 6,324,317 B1 * | 11/2001 | Tanaka et al. ................ 385/24 |
| 6,486,993 B1 | 11/2002 | Kuroshima |
| 2003/0180019 A1 * | 9/2003 | Tirloni ....................... 385/127 |

FOREIGN PATENT DOCUMENTS

| | | |
|---|---|---|
| EP | 0 554 714 A1 | 8/1993 |
| EP | 0 701 340 A2 | 3/1996 |
| EP | 0 701 340 A3 | 11/1996 |
| EP | 0 777 347 A2 | 6/1997 |
| EP | 0 777 347 A3 | 4/1998 |
| EP | 1 035 671 A2 | 9/2000 |

(List continued on next page.)

OTHER PUBLICATIONS

D. Le Guen et al, Narrow Band 640 Gbit/s Soliton WDM Transmission over 1200 km of Standard Fibre with 100 km–21 dB Amplifier Spans, ECOC, 1998, Sep. 20–24, 1998, pp. 61 and 63.

(List continued on next page.)

*Primary Examiner*—Brian Healy
*Assistant Examiner*—Tina M Lin
(74) *Attorney, Agent, or Firm*—Christie, Parker & Hale, LLP

(57) ABSTRACT

An optical fiber transmission line for realizing satisfactory long haul transmission characteristics using two kinds of optical fibers. The optical fiber transmission line includes a plurality of local dispersion compensating spans, wide dispersion compensating spans disposed at predetermined intervals, and optical repeating amplifiers to connect each span. The local dispersion compensating span includes a first optical fiber with positive dispersion having an effective core area of 130 $\mu m^2$ or more and a second optical fiber with a negative dispersion value of –50 ps/nm/km or less to transmit the light output from the first optical fiber. The wide dispersion compensating span consists of a third optical fiber having the same configuration and composition with the first optical fiber.

6 Claims, 4 Drawing Sheets

FOREIGN PATENT DOCUMENTS

| | | |
|---|---|---|
| EP | 1 035 671 | 9/2000 |
| FR | 2 761 839 A1 | 10/1998 |
| GB | 2 309 131 A | 7/1997 |
| JP | 6-11620 | 1/1994 |
| JP | 10-221562 | 8/1998 |
| JP | 2000-31902 | 1/2000 |
| JP | 2000-82995 | 3/2000 |
| WO | WO 00 38356 | 6/2000 |

OTHER PUBLICATIONS

M. Murakami et al, Long–Haul 16×10 WDM Transmission Experiment Using Higher Order Fiber Dispersion Management Technique, ECOC, 1998, Sep. 20–24, 1998, pp. 313–314.

T. Matsuda et al, 340 Gbit/s (34×10 Gbit/s) WDM transmission over 8,514km using broadband gain equalisation technique for transoceanic systems, Electronics Letters, $24^{th}$ Jun. 1999, vol. 35, No. 13, pp. 1090–1091.

T. Tanaka et al, 2.1–Tbit/s WDM Transmission Over 7,221km with 80–km Repeater Spacing, ECOC, 2000, Sep. 3–7, 2000, 4 pages.

I. Morita et al, 40 Gb/s Single–Channel Soliton Transmission Over Transoceanic Distances by Reducing GordonHaus Timing Jitter and Soliton—Soliton Interaction, Journal of Lightwave Technology, vol. 17, No. 12, Dec. 1999, 2506–2511.

I. Morita et al, 40 Gbit/s X 16 WDM Transmission Over 2000km Using Dispersion Managed Low–Nonlinear Fiber Span, ECOC 2000, Sep. 3–7, 2000, pp. 25–27 (5 pages total).

M. Suzuki et al, 20 Gbit/s–based soliton WDM transmission over transoceanic distances using periodic compensation of dispersion and its slope, Electronics Letters, Apr. $10^{th}$ 1997, vol. 33, No. 8, pp. 691–692.

H. Taga et al, 213 Gbit/s (20×10.66Gbit/s), over 9000km Transmission Experiment using Dispersion Slope Compensator, OFC 1998, pp. PD13–1 –PD13–4.

T. Naito, et al., "1 Terabit/s WDM Transmission over 10,000km" ECOC '99 PDPD2–1, Nice, 1999.

EP Search Report, dated Jul. 5, 2001.

EP Search Report, dated Jul. 19, 2001.

Patent Abstract of Japan, Publication No. 08237222, Published Sep. 13, 2002, in the name of Nippon Telegr & Teleph Corp.

Taga et al., "20 WDM, 10.66 Gbit/s transmission experiment over 9000 km using periodic dispersion slope compensation," Electronics Letters, Mar. 5, 1998, vol. 34 No. 5, pp. 476–478.

Kikuchi, et al., "Analysis of cross–phase modulation (XPM) effect on WDM transmission performance," Electronics Letters, Apr. 10, 1997, vol. 33 No. 8, pp. 653–654.

M. Murakami et al: Long–Haul 16×10 Gb/s WDM Transmission Experiment Using Higher Order Fiber Dispersion Management Technique: IEEE Photonics Technology Letters, No. 11, No. 7, Jul. 1999; p. 898–900.

T. Tsuritani et al: '340 Gbit/s (32×10.66 Gbit/s) WDM transmission over 6054km using hybrid fibre spans of large core fibre and dispersion shifted fibre with low dispersion slope': Electronics Letters. Apr. 15, 1999, vol. 35, No. 8, 2 pages.

K. Tanaka et al; '320 Gbit/s (32×10.7Gbit/s) error–free transmission over 7280km using dispersion flattened fibre link with standard SMF and slope compensation DCF'; Electronics Letters; Oct. 14, 1999, vol. 35, No. 21, p. 1860–1862.

European Search Report, dated Oct. 9, 2002, for European Patent Office Application No. 00119594.0–1246.

European Search Report dated May 20, 2003 for corresponding European Patent Application EP 01 12 4999.

* cited by examiner

OPTICAL FIBER TRANSMISSION LINE

CROSS-REFERENCE TO RELATED APPLICATION

This application claims priority of Japanese Patent application number 2001-023300, flied Jan. 31, 2001.

1. Field of the Invention

This invention relates to an optical fiber transmission line in which chromatic dispersion is controlled.

2. Background of the Invention

In a long haul optical fiber transmission system, dispersion compensating fibers are disposed at appropriate intervals because it is necessary to control accumulated chromatic dispersion within a predetermined value (See U.S. Pat. No. 5,361,319).

In wavelength division multiplexing (WDM) optical transmission that has attracted public attention as a means to increase a transmission capacity, there is another problem that accumulated chromatic dispersion differs per wavelength since chromatic dispersion of a transmission optical fiber differs per wavelength (this is called as a dispersion slope). Although a configuration to compensate the difference of accumulated chromatic dispersion values between the wavelengths at a receiver or transmitter side is proposed, the dispersion amount that the transmitter or receiver side can compensate is limited. In addition, the permissible difference of dispersion values tends to decrease as a bit rate per channel increases.

Such an optical transmission line has been proposed that locally compensates the accumulated chromatic dispersion per optical repeating span and widely compensates the accumulated chromatic dispersion per predetermined number of optical repeating spans simultaneously (See, for example, Japanese Laid-Open Patent Publication No. 2000-82995, T. Naito et at., ECOC '99 PDPD2-1, Nice, 1999, and EP 1035671 A2).

In the configurations disclosed in the Japanese Laid-Open Patent Publication No. 2000-82995 and paper by Naito et al, when an optical fiber having the dispersion value between −20 ps/nm/km and −45 ps/nm/km is used as a negative dispersion fiber, the ratio of the length of the negative dispersion fiber to a positive dispersion fiber increases. Consequently, optical input power given to the negative dispersion fiber having a relatively small effective core area increases and accordingly signal degradation due to the nonlinear effect also increases.

In the configuration disclosed in EP 1035671 A2, since the local dispersion Dlocal is set to a positive value (between +1 ps/nm/km and +4 ps/nm/km), a dispersion compensating fiber to be disposed at a wide area compensating span must be a negative dispersion fiber. In consideration of practical maintenance of a system, it is preferable that the interval of repeaters should be 20 km or more and also the length of each repeating span should be approximately equivalent. However, if a negative dispersion fiber with a dispersion value of −50 ps/nm/km or less (absolute value is 50 ps/nm/km or more) is used for the compensation of the wide area, the length of approximately 10 km is sufficient and this is very different as compared to the lengths of other repeating spans. Therefore, to equalize the lengths of all repeating spans, it is necessary to provide a third optical fiber with a different chromatic dispersion value as a dispersion fiber for the wide area compensation, which means the to use of three kinds of optical fibers. This makes the maintenance of the system very difficult. For instance, when broken parts are to be connected, it is required to provide three kinds of optical fibers and insert one of the fibers after selecting a suitable one for the optical fiber with the broken parts.

In addition, since the effective core area of a negative dispersion fiber is small, it is necessary to decrease the optical input power to reduce the degradation of transmission performance due to nonlinear effect in the negative dispersion fiber at the repeating span for wide area compensation. For example, it is necessary to dispose an attenuator immediately in front of the negative dispersion fiber.

SUMMARY OF THE INVENTION

It is therefore an object of the present invention to provide a low nonlinear optical fiber transmission line in which two kinds of optical fibers flatten chromatic dispersion.

An optical fiber transmission line according to the invention consists of a plurality of local dispersion compensating spans, a wide area dispersion compensating span disposed at predetermined intervals, and optical repeating amplifiers to connect each span, wherein the local dispersion compensating span consists of a first optical fiber of positive dispersion having an effective core area of 130 $\mu m^2$ or more and a second optical fiber having a negative dispersion value of −50 ps/nm/km or less to transmit an optical signal output from the first optical fiber. The wide area dispersion compensating span consists of a third optical fiber having the same configuration and composition as the first optical fiber.

Owing to the above dispersion control, satisfactory transmission characteristics can be realized even on the long haul transmission. Furthermore, the maintenance control becomes easier because only two kinds of the optical fibers are used.

Preferably, the distance of the wide area dispersion compensating span is substantially equal to that of the local dispersion compensating span. Accordingly, optical amplifiers of the same configuration can be used for both spans. This also makes the maintenance control easier.

Preferably, the average chromatic dispersion after the dispersion compensation by the second optical fiber at the local dispersion compensating span should be between −4 ps/nm/km and −1 ps/nm/km. This can realize high speed and large capacity WDM transmission on the long haul transmission of 1000 km or more.

BRIEF DESCRIPTION OF THE DRAWINGS

The above and other objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
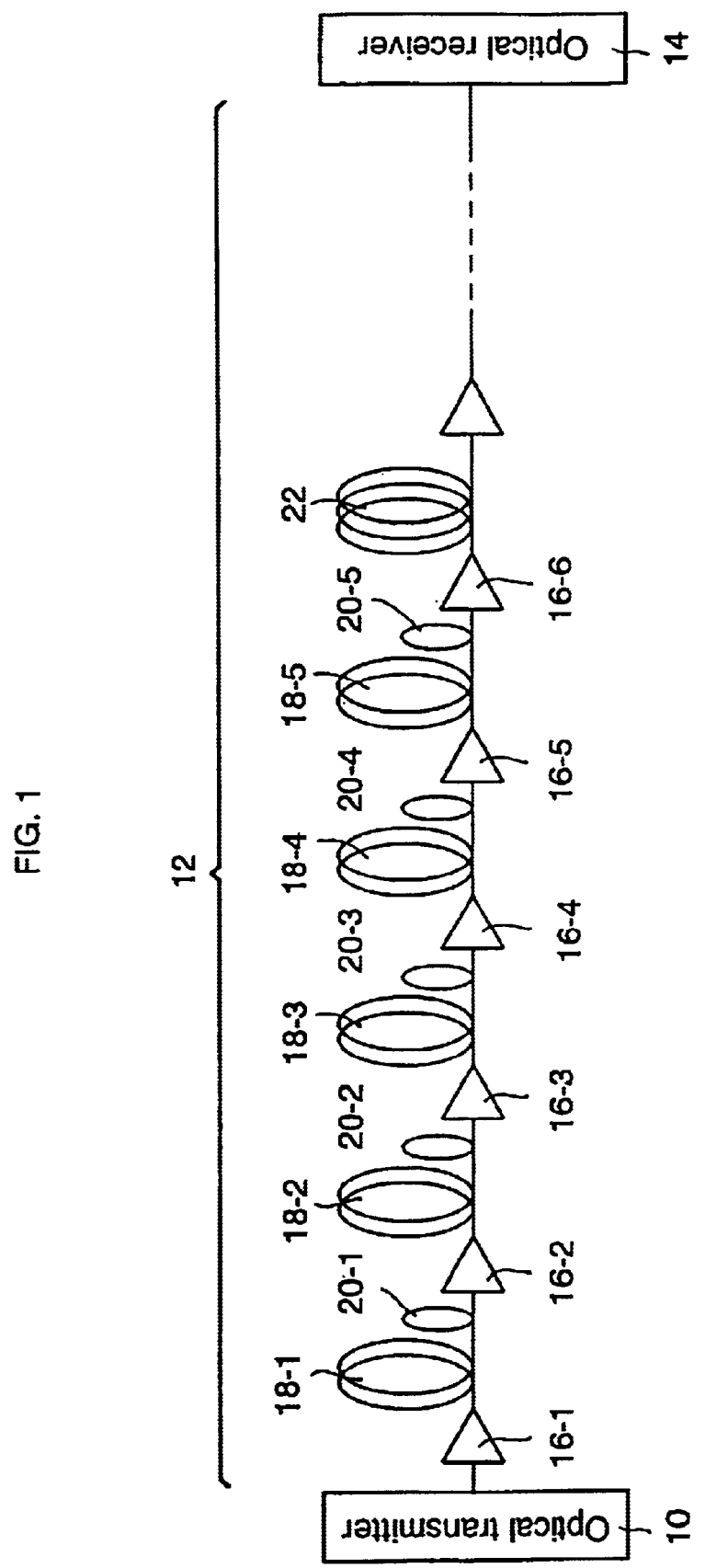
FIG. 1 shows a schematic block diagram of a first embodiment according to the invention.
Figure 2:
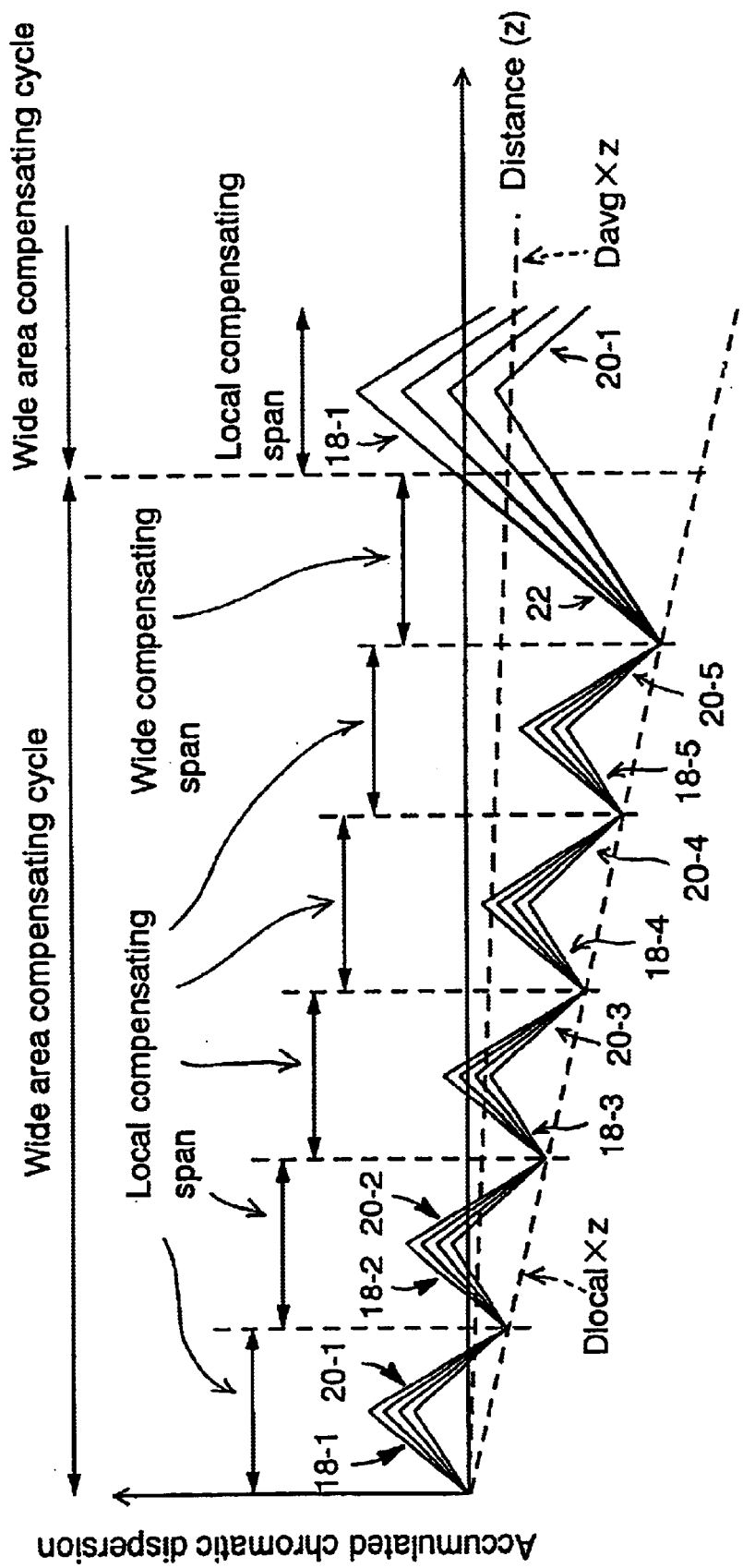
FIG. 2 shows a schematic diagram of distance variation of accumulated chromatic dispersion of the embodiment shown in FIG. 1.

FIG. 1 shows a schematic block diagram of a first embodiment according to the invention, and FIG. 2 shows a schematic diagram of a dispersion map, namely the variation of accumulated chromatic dispersion as a function of distance.

Optical transmitter 10 launches a WDM optical signal onto an optical transmission line 12. Optical receiver 14 receives the WDM optical signal propagated on the optical transmission line 12. The optical transmission line 12 consists of a plurality of repeating spans partitioned by optical amplifiers 16 (16-1, 16-2 . . . ). In this embodiment, the accumulated chromatic dispersion and dispersion slope are locally compensated per repeating span and the accumulated chromatic dispersion is widely compensated per predetermined number of the repeating spans simultaneously. The repeating span to locally compensate the chromatic dispersion is called as a local compensating span and the repeating span to widely compensate the chromatic dispersion is called a wide compensating span. In the embodiment shown in FIG. 1, the local compensating span equals to one repeating span. One repeating span after five local compensating spans becomes the wide compensating span. In the embodiment shown in FIG. 1, the five local compensating spans and the following one wide compensating span form a basic unit, and this basic unit is repeated until reaching the optical receiver 14.

The local compensating span consists of a positive dispersion optical fiber 18 (18-1, 18-2 . . . ) and a negative dispersion optical fiber 20 (20-1, 20-2 . . . ) to transmit the output light from the positive dispersion optical fiber 18. The wide compensating span consists of a positive dispersion optical fiber 22 alone that is composed of the same optical fiber as the positive dispersion optical fiber 18. In this embodiment, one repeating span is set to 20 km or more, the effective core area Aeff of the positive dispersion optical fibers 18 and 22 is set to 130 $\mu m^2$ or more, and the negative dispersion optical fiber 20 consists of an optical fiber with the chromatic dispersion of −50 ps/nm/km or less, namely an optical fiber with the negative chromatic dispersion having the absolute value of 50 ps/nm/km or more.

As shown in FIG. 2, the chromatic dispersion and length of the positive dispersion optical fibers 18, 22 and negative dispersion optical fiber 20 are set so that the chromatic dispersion value after the local dispersion compensation, namely the local average chromatic dispersion Dlocal becomes a negative value and the chromatic dispersion value after the wide dispersion compensation, namely the wide chromatic dispersion value Davg becomes a positive value or negative value near to zero. In principle, the length of each repeating span is identical. With the above configuration, optical amplifiers with the same configuration and gain characteristics can be used for every optical amplifier 16 and therefore the maintenance becomes much easier.

Preferably, Dlocal should be approximately between −1 ps/nm/km and −4 ps/nm/km. owing to this dispersion control, the transmission capacity increases 1.5 times as much as that of the conventional systems.

In this embodiment, the dispersion slope is not compensated at the wide compensation stage. Accordingly, the accumulated chromatic dispersion per wavelength expands in the period of the wide compensating span. However, one of the merits of this embodiment is that the maintenance becomes much easier since the optical transmission line part can be formed using only two kinds of optical fibers. Moreover, even on 10000 km transmission, the transmission characteristics hardly receive any bad influence from not compensating the dispersion slope in the wide compensating span.

Figure 3:
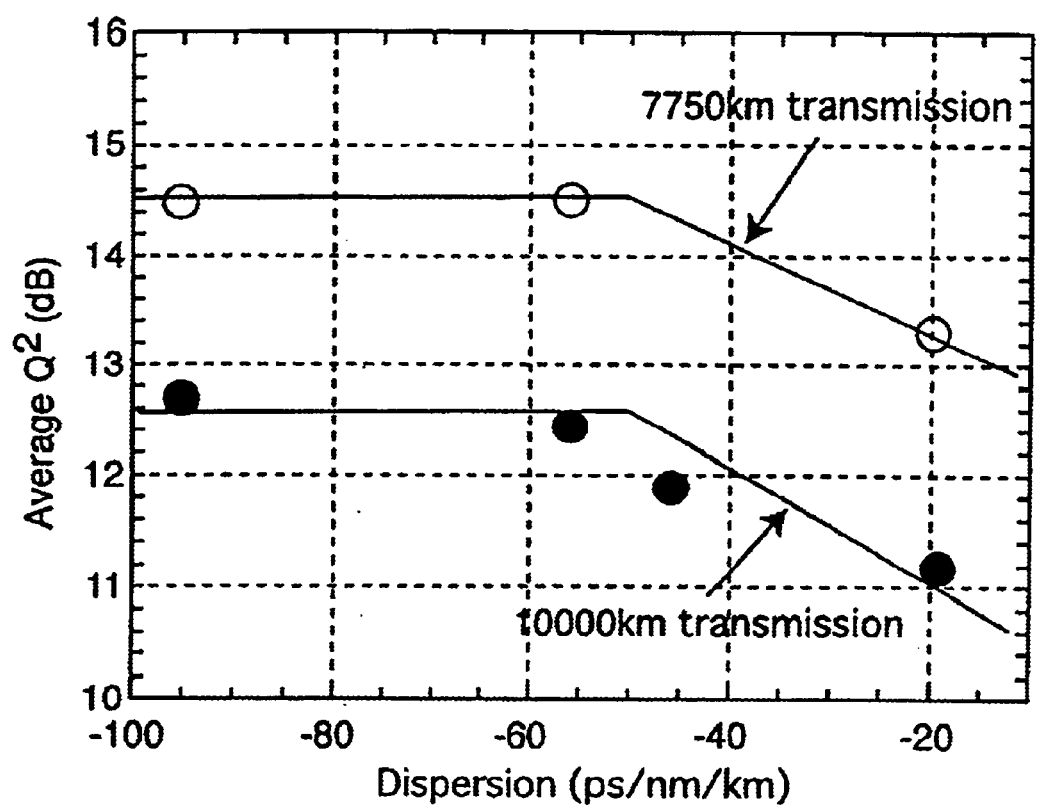
FIG. 3 shows measured examples indicating the influence of dispersion value of a negative dispersion optical fiber 20.

The desirable dispersion values of the negative dispersion optical fiber 20 are measured at 7750 km and 10000 km transmissions respectively. The measured results are shown in FIG. 3. The horizontal axis expresses the dispersion values of the negative dispersion optical fiber 20 and the vertical axis expresses the average values of Q2 (dB). Obviously from FIG. 3, the chromatic dispersion value of the negative dispersion optical fiber 20 should be set to −50 ps/nm/km or less.

Figure 4:
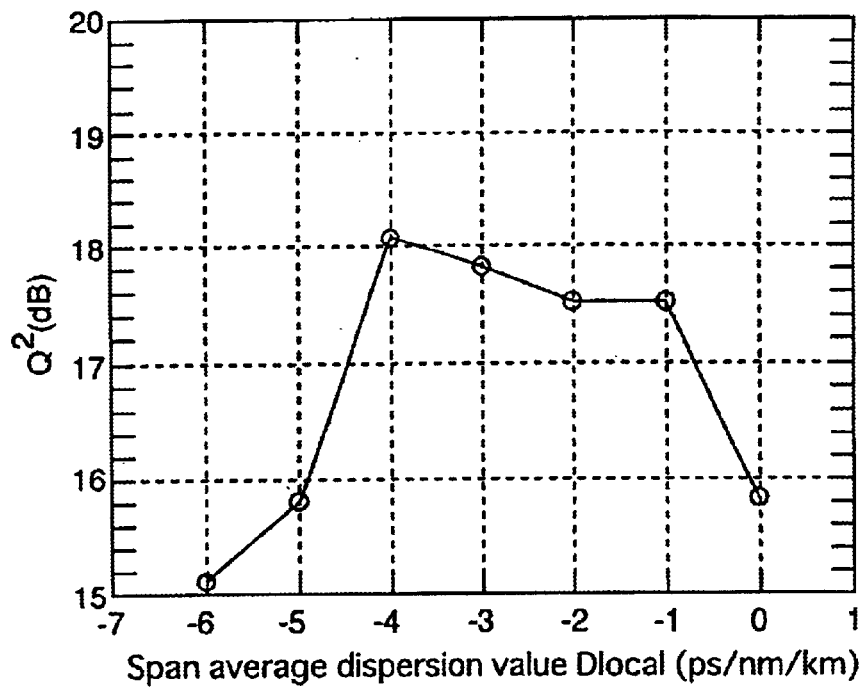
FIG. 4 shows measured examples of the optimum range of Dlocal.

The optimum range of the local dispersion value Dlocal is measured. The measured results are shown in FIG. 4. Here, the transmission distance is 6000 km and 16 wavelengths of 10 Gbit/s are multiplexed. The wide compensation is performed every seven repeating spans. Dlocal is scanned through varying the dispersion values of the negative dispersion optical fiber 20. The other parameter values are as mentioned above. The horizontal axis expresses Dlocal (ps/nm/km) and the horizontal axis expresses $Q^2$ (dB). Obviously from FIG. 4, satisfactory results can be obtained by setting Dlocal to the range between −1 ps/nm/km and −4 ps/nm/km.

Figure 5:
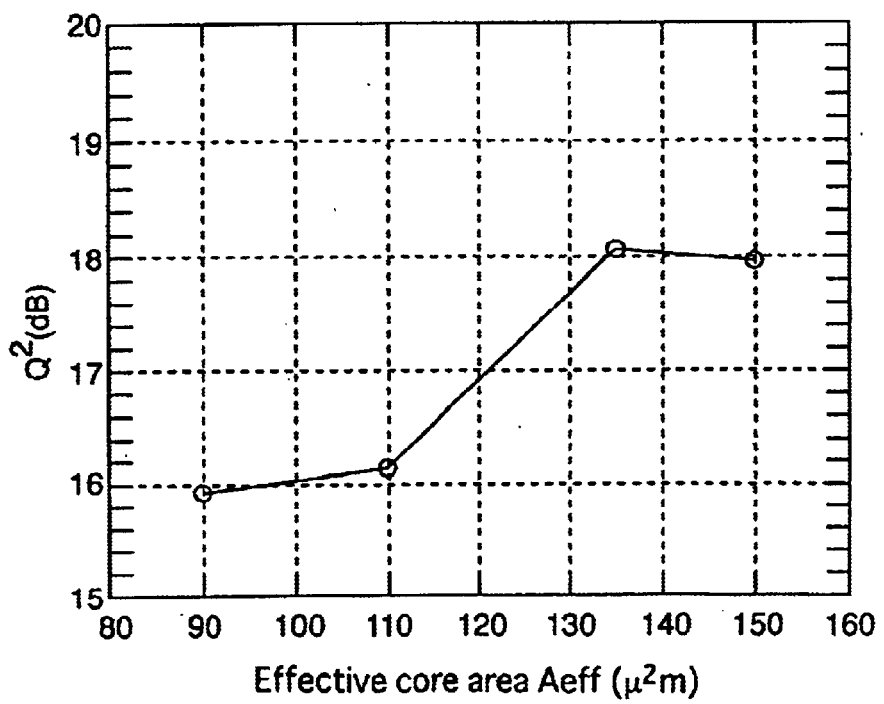
FIG. 5 shows the measured preferable range of the effective core areas of positive dispersion optical fibers 18 and 22.

FIG. 5 shows the measured result of the influence of the effective core area Aeff of the positive dispersion optical fibers 18 and 22. The horizontal axis expresses the effective core area of the positive dispersion optical fibers 18, 22 and the vertical axis expresses Q2 (dB). The transmission distance is 6000 km and 16 wavelengths of 10 Gbit/s are multiplexed. Dlocal is set to −4 ps/nm/km and the wide compensation is performed every seven repeating spans. Obviously from FIG. 5, the effective core area Aeff of the positive dispersion optical fibers 18 and 22 should preferably be set to 130 $\mu m^2$ or more.

The material dispersion of the positive dispersion fiber is approximately +20 ps/nm/km at the 1.5 $\mu m$ band, which is substantially the maximum value. On the other hand, the negative dispersion fiber has the negative dispersion and negative dispersion slope at the 1.5 $\mu m$ band, and its effective core area is approximately between 20 and 30 $\mu m^2$, which is substantially the maximum value.

As is readily understandable from the aforementioned explanation, according to the invention, satisfactory long haul transmission characteristics can be realized by using two kinds of optical fibers. In addition, the dispersion management and maintenance become much easier, and satisfactory transmission characteristics can be realized at high speed and large capacity WDM transmission.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical fiber transmission line comprising a plurality of local dispersion compensating spans, wide dispersion compensating spans disposed at predetermined intervals, and optical repeating amplifiers to connect each span;

wherein the local dispersion compensating span includes a first optical fiber with positive dispersion having an effective core area of 130 $\mu m^2$ or more and a second optical fiber with a negative dispersion value of −50 ps/nm/km or less to transmit an optical signal output from the first optical fiber; and wherein the wide dispersion compensating span includes a third optical fiber having the same configuration and composition as the first optical fiber.

2. The optical fiber transmission line of claim 1 wherein the distance of the wide dispersion compensating span is substantially equal to that of the local dispersion compensating span.

3. The optical fiber transmission line of claim 1 wherein the average chromatic dispersion of the local dispersion compensating spans after the dispersion compensation by the second optical fiber is between −4 ps/nm/km and −1 ps/nm/km.

4. A method of flattening chromatic dispersion in an optical fiber transmission line comprising providing a plurality of serially repeating wide area optical fiber transmission line compensating spans for transmitting an optical signal, each serially repeating wide area optical fiber transmission line compensating span including:

a plurality of serially repeating local dispersion compensating spans, each local dispersion compensating span being formed by:
        providing a first optical amplifier;
        coupling a first optical fiber to the first optical amplifier, the first optical fiber having a positive dispersion and an effective core area of 130 $\mu m^2$ or more; and
        coupling a second optical fiber to the first optical fiber, the second optical fiber having a negative dispersion value of −50 ps/nm/km or less; and a wide dispersion compensating span disposed serially after the plurality of serially repeating local dispersion compensating spans, each wide dispersion compensating span being formed by:
        providing a second optical amplifier; and
        coupling a third optical fiber to the second optical amplifier, the third optical fiber having the same configuration and composition as the first optical fiber.

5. The method of flattening chromatic dispersion in an optical fiber transmission line of claim 4, wherein the distance of the wide dispersion compensating span is substantially equal to that of the local dispersion compensating span.

6. The method of flattening chromatic dispersion in an optical fiber transmission line of claim 4, wherein the average chromatic dispersion of the local dispersion compensating spans after the dispersion compensation by the second optical fiber is between −4 ps/nm/km and −1 ps/nm/km.

\* \* \* \* \*